May 5, 1936. F. N. TILTON 2,039,368
SCREW
Filed Oct. 26, 1934
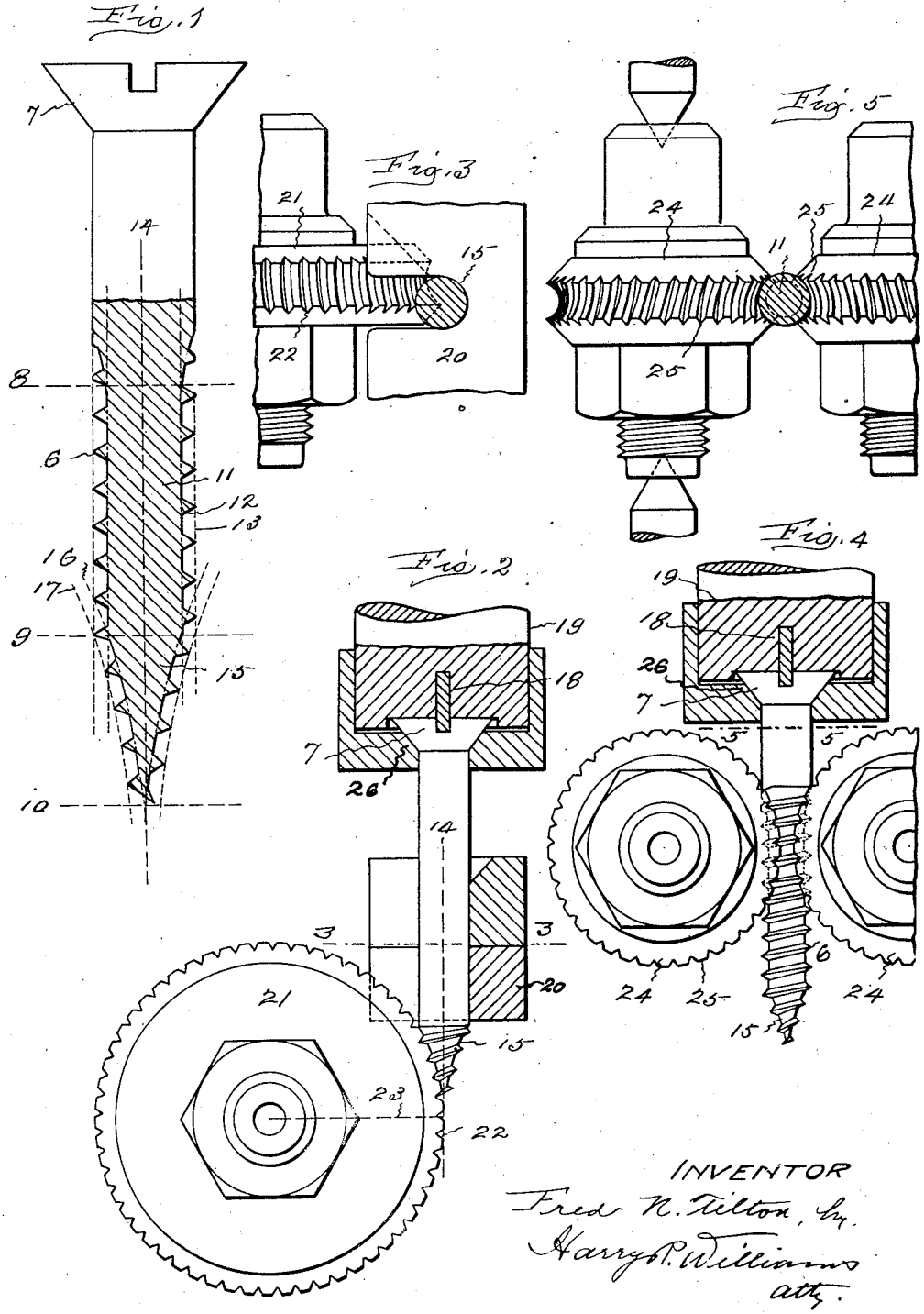

Patented May 5, 1936

2,039,368

UNITED STATES PATENT OFFICE 2,039,368

SCREW

Fred N. Tilton, Hartford, Conn.

Application October 26, 1934, Serial No. 750,029

7 Claims. (Cl. 85—46)

This invention relates more particularly to the type of screws known as "wood screws".

The object of the invention is to provide a wood screw having a contour that permits it to be made commercially very rapidly in large quantities to accurate predetermined dimensions with a body outline, point and thread form which will enter wood easily and hold securely.

In the embodiment of the invention illustrated the core of the body section is constant in diameter from start of the full thread to the point section, and the core of the point section is concave from the body section to the tip. Upon the cylindrical body section is a cut and rolled thread which is smooth and has a true apex, and upon the concave point section is a cut and rolled thread that extends to the tip fuller, or higher, than is possible on the convex point core or straight cone point core of the screws produced by the wood screw machines in general use.

In the accompanying drawing Fig. 1 shows on large scale a wood screw that embodies the features of this invention, that is, a screw with a body core and thread of constant diameter, and a concave point core and thread.

Fig. 2 on smaller scale illustrates a method of forming and threading the concave point section of the screw.

Fig. 3 is a transverse section on the plane indicated by the dotted line 3—3 on Fig. 2.

Fig. 4 illustrates a method of and means for threading the constant body section of the screw.

Fig. 5 is a transverse section on the plane indicated by the dotted line 5—5 on Fig. 4.

The screw which embodies this invention may be any length and size, it may have a single thread or multiple thread, either right or left hand, of any desired pitch and angular section, and the head may be of any style. The screw shown has a single right hand thread 6 of normal pitch and standard angle, and a slotted flat head 7. For the purpose of description the body section is assumed to extend from the dotted line 8 to the dotted line 9, and the point section to extend from the dotted line 9 to the dotted line 10 on Fig. 1. The core 11 of the body section has the same diameter from start to the point section, as indicated by the dotted lines 12 and the thread on this section of the core is constant, that is, has a uniform maximum diameter, as indicated by the dotted lines 13, which lines 12 and 13 are parallel with the axis 14. The core 15 of the point section is concave from the body section to the tip, as indicated by the dotted lines 16, and the apex of the thread on this section of the core is also concave, the arc of its curvature being parallel with the core curvature, as indicated by dotted lines 17 on Fig. 1.

This shape of body and point core and thread may be produced by such a machine as is illustrated and described in my application S. No. 690,533, filed September 22, 1933. In the operation of that machine the screw blank is rapidly rotated by the engagement with its slotted head of a blade 18 at the lower end of a rotatable and longitudinally movable spindle 19, and the point end of the blank is engaged by a freely rotatable hob 21. The periphery of this hob is concave with oblique transverse grooves cut on the pitch of the thread to be produced, and thus has a large number of cutting teeth 22 on the arc of a circle.

The center of the hob is located at one side of the axis 14 of the blank a distance equal to or slightly less than the radius 23 of the hob, as indicated on Fig. 2. As a result of this the hob teeth point the blank, and turning on a circle they concave the point on an arc that is concentric with the center of the cutter, the length of the point being determined by the off-set distance of the hob center from the blank axis. The head end of the blank is retained by the guide 26 and the point end of the blank is supported by the guiding back rest 20, so that the blank axis will always remain in the same relation to the radius of the hob.

In the machine of the application referred to, the blank, after being pointed and the point threaded, is carried into line with body threading cutters. These cutters are opposed complementary hobs 24 mounted so that they may rotate freely and they have concave diagonally slotted peripheries which provide a plurality of annularly disposed teeth 25. The pitch of these teeth may be the same as the pitch of the teeth of the pointing hob, or may if desired be somewhat different so that the pitch of the thread on the body can be the same or although continuous may vary from the pitch of the thread on the point. As the body threading hobs rise and the blank travels between them, the teeth engage the thread already on the point, and as the blank rotates the hobs move up and cut the thread on the body. The axes of these hobs being fixed and the head end of the blank being retained by the guide 26, the thread is cut of constant height, that is, the longitudinal plane of the apex of the thread will be parallel with the blank axis and the longitudinal plane of the thread root will be parallel with the blank axis, as previously mentioned. After the body thread is formed the hobs travel down the thread they have cut and the screw is discharged.

Owing to the compression the rapidly rotating blank receives between the pointing hob and guide and between the body threading hobs which rotate in the same direction when the blank travels in, and in the same direction when the blank travels out, not only is the thread rapidly cut, but the metal is forced into the cutter grooves so the thread is required to conform to the shape of the grooves and to be of exact size with its faces burnished smooth.

A further contributing factor to accuracy is that the thread being formed at one pass, progressing from the point toward the head, there is always the full strength of the blank ahead of the cutters, that is, the blank is full size between the cutters and the firmly retained head. The thread formed by the present wood screw machines is formed by several passes of a cutter away from the head toward the point and this weakens the blank between the head and the cutter as the cuts proceed, which weakness allows a yielding that prevents the formation of an ideal thread.

This screw has on its concave point a full thread that terminates in a gimlet or ideal point which contributes to the quick entry of the screw into wood, the body being of constant size and the thread being smooth and of accurate predetermined dimensions furthers the easy entry into and sure hold of the screw in the material to be entered.

The invention claimed is:—

1. A wood screw having a body core of uniform diameter and a point core which is concave from the body core to the extreme tip, with a thread that has a constant maximum diameter on the body core and continues uniform, full and true on the point core to the tip.

2. A wood screw having at the point end a concave core and a true, uniform thread that extends to the tip at its point end.

3. A wood screw that has a concave threaded point extending to the tip.

4. A wood screw that has a concave point and a cut and planish finished thread.

5. A wood screw that has a concave threaded point, the concave arc of the point core and the concave arc of the apex of the point thread being substantially concentric.

6. A wood screw that along its body and on its point has a thread that is cut to substantially finished size and is rolled practically synchronously with the cutting, whereby the physical structure of the core is not destructively crushed, and the surface of the threads, that were weakened by the cutting operation, are compacted, hardened and smoothed by the rolling operation.

7. A wood screw that along its body and on its point has a thread that is cut to substantially finished size and immediately, while heated from the cutting operation, rolled, whereby the physical structure of the core is not destructively crushed and the cut surfaces of the threads are compacted, hardened and smoothed by the rolling operation.

FRED N. TILTON.